(12) United States Patent
Hanold et al.

(10) Patent No.: US 10,650,611 B1
(45) Date of Patent: May 12, 2020

(54) SYSTEMS AND METHODS FOR GRAPHICAL PROGRAMMING

(71) Applicant: ATLATL Software, Inc., Charleston, SC (US)

(72) Inventors: Andrew McClain Hanold, Charleston, SC (US); Benjamin Cowles, Summerville, SC (US); Philip Bailey, Charleston, SC (US); Eric Wood, Charleston, SC (US); Eric Benn, Charleston, SC (US); Jeremy Batts, Johns Island, SC (US); Zach Hixson, Goose Creek, SC (US); Renald Jean-Charles, Charleston, SC (US); Lucas Stertz, Charleston, SC (US); Justin Williams, Charleston, SC (US); Jonathan Faulhaber, Charleston, SC (US); Brian Sweet, Charleston, SC (US)

(73) Assignee: ATLATL SOFTWARE, INC., Charleston, SC (US)

(*) Notice: Subject to any disclaimer, the term of this patent is extended or adjusted under 35 U.S.C. 154(b) by 0 days.

(21) Appl. No.: 16/129,196

(22) Filed: Sep. 12, 2018

Related U.S. Application Data

(60) Provisional application No. 62/557,475, filed on Sep. 12, 2017.

(51) Int. Cl.
   *G06T 19/20* (2011.01)
   *G06T 19/00* (2011.01)
   *G06T 17/00* (2006.01)
   *G06F 21/31* (2013.01)
   *G06F 8/34* (2018.01)
   *G06F 30/00* (2020.01)

(52) U.S. Cl.
   CPC ............... *G06T 19/20* (2013.01); *G06F 8/34* (2013.01); *G06F 21/31* (2013.01); *G06F 30/00* (2020.01)

(58) Field of Classification Search
   None
   See application file for complete search history.

(56) References Cited

U.S. PATENT DOCUMENTS

| | | | |
|---|---|---|---|
| 7,028,902 B2 | 4/2006 | Xu et al. |
| 7,823,784 B2 | 11/2010 | Matsumoto |
| 7,900,847 B2 | 3/2011 | Lindahl et al. |
| 8,098,408 B2 | 1/2012 | Sawada et al. |
| 8,584,931 B2 | 11/2013 | Kim |

(Continued)

*Primary Examiner* — Tize Ma
(74) *Attorney, Agent, or Firm* — Morris, Manning & Martin, LLP; Bryan D. Stewart; Daniel T. Begasse

(57) ABSTRACT

Systems and methods for creating, storing, and manipulating 3D objects in a software-supported virtual environment, without having to release new versions or renderings of the software-supported virtual environment, are disclosed. The system includes one or more graph files for defining particular 3D objects, where the one or more graph files define the object behavior in the software-supported virtual environment. A mobile application included in the system may receive the one or more graph files for displaying the 3D objects. A user of the mobile application may visually manipulate or configure the 3D objects, such as extending or rotating the 3D objects, which results in real-time adjustments to the one or more graph files, the display, and additional services such as price quoting.

14 Claims, 10 Drawing Sheets

(56) References Cited

U.S. PATENT DOCUMENTS

| | | |
|---|---|---|
| 8,606,645 B1 | 12/2013 | Applefeld |
| 8,645,220 B2 | 2/2014 | Harper |
| 8,950,673 B2 | 2/2015 | Madej |
| 9,058,764 B1 | 6/2015 | Persson |
| 9,365,035 B2 | 6/2016 | Jintsugawa et al. |
| 9,449,342 B2 | 9/2016 | Sacco |
| 9,667,716 B2 | 5/2017 | Eggert |
| 9,912,555 B2 | 3/2018 | Oshiba |
| 10,147,028 B2 | 12/2018 | Ito |
| 2003/0217329 A1 | 11/2003 | Good |
| 2005/0099442 A1 | 5/2005 | Payne |
| 2005/0234835 A1 | 10/2005 | Stonoha |
| 2006/0038833 A1 | 2/2006 | Mallinson et al. |
| 2006/0086811 A1 | 4/2006 | Yoshida et al. |
| 2007/0038944 A1 | 2/2007 | Carignano |
| 2007/0086638 A1 | 4/2007 | Ackley |
| 2009/0132371 A1* | 5/2009 | Strietzel ............... G06Q 30/02 705/14.46 |
| 2009/0255993 A1 | 10/2009 | Barber |
| 2012/0199647 A1 | 8/2012 | Hwang et al. |
| 2013/0111330 A1* | 5/2013 | Staikos ................ G06F 17/21 715/241 |
| 2014/0071467 A1 | 3/2014 | Asada |
| 2014/0203071 A1 | 7/2014 | Eggert |
| 2014/0280832 A1 | 9/2014 | Oshiba |
| 2014/0282398 A1* | 9/2014 | Podolyak ............... G06F 8/71 717/121 |
| 2014/0304578 A1 | 10/2014 | Parkinson et al. |
| 2014/0364092 A1 | 12/2014 | Rose |
| 2016/0019407 A1 | 1/2016 | Yoshida |
| 2016/0180136 A1 | 6/2016 | Meier |
| 2016/0189016 A1 | 6/2016 | Windmueller |

\* cited by examiner

SYSTEMS AND METHODS FOR GRAPHICAL PROGRAMMING

CROSS REFERENCE TO RELATED APPLICATIONS

This application claims the benefit of, and priority to, U.S. Provisional Patent App. No. 62/557,475, filed on Sep. 12, 2017, and entitled "CREATION GRAPH," as if the same was included herein in its entirety.

BACKGROUND

Generally, conventional 3D programming systems require a final render or build of the configuration files prior to presenting 3D displays. These 3D displays may allow for user interaction, however, any changes or adjustments to the 3D displays require a re-render, rebuild, or overall release of a new version of the 3D displays to incorporate the changes or adjustments. These traditional programming methods are inefficient and cumbersome for producing 3D and visual item-configurable systems. Therefore, there exists a long-felt but unresolved need for systems and methods that allow for "on the fly" configuration and dynamic adjustments to 3D displays, without the need to manually re-code and rebuild the files supporting the 3D displays.

BRIEF SUMMARY OF THE DISCLOSURE

The present systems and methods relate generally to systems and methods that enable efficient creation, storage, and updates to item behavior without having to re-render a current three-dimensional configuration or release a new version of the configuration. In particular, in various embodiments, the systems and methods disclosed herein are directed to: 1) an improvement to visual programming systems and methods, which enables the visual organization of predefined portions of functionality and logic to define product behavior; and 2) an improved data solution that stores behavior information in an item agnostic way and enables an application to load and manipulate product properties dynamically at runtime.

The systems and methods disclosed herein may be used within the context of a 3D configurator sales tool (e.g., a mobile application) that allows a user to build and configure 3D items, parts, products, and assemblies "on the fly." Each item, part, object, and/or product may have its own parameters based on a company's inventory, production abilities, the item's own physical constraints, etc. These parameters may be programmed and uploaded to an application from a centralized cloud repository, or other appropriate remote storage system. When these part/product parameters are changed or updated, it may be advantageous to have a system that allows for visual programming and organization of pre-defined portions of functionality, which helps to eliminate modifying the original code base and reduces time and effort by shorting the quality control aspects of these changes (e.g., only the changes need to be run through quality control, not the entire code base). Further, with the disclosed systems and methods, a single application can load updated product properties without the need for a re-download, re-install, or re-render of the application.

The present systems and methods are directed towards improvements to a computer-related technology, namely, a graphical/visual programming system and methods that "splits" certain aspects and behaviors of a particular item/part/product into different assets (files) that are separately downloaded and combined by a 3D configurator application. According to some aspects of the present systems and methods, splitting certain aspects and behaviors of a particular item/part/product may allow the properties of the item/part/product to be separately updated without requiring rewrites/edits to the original (and/or entire) code base for the particular item/part/product.

In a particular embodiment, a user may download an application (3D configurator) on a computing device, such as a tablet computer. The user may then, continuing with this embodiment, input certain credentials corresponding to his/her relationship with a certain company or organization. In this embodiment, based on the user's credentials, the user is granted access to certain configurable items that are pre-configured with certain adjustable parameters. Further, in this embodiment, the 3D configurator may automatically download (or receive for download) certain configurable items for which the user has been granted access. As discussed herein, enabling the user access to certain configurable items via credentials (through the unique architecture, systems, and methods disclosed herein) is an improvement over systems wherein the user has to download a new instance/update of the 3D configurator application each time the configurable items are updated (e.g., the user is granted access to a new item or pre-configured item dimensions are changed).

Furthermore, once a user has logged into a 3D configurator and the 3D configurator has granted the user access to various configurable items (as discussed immediately above), the user can build an assembly "on the fly" and pre-loaded parts can be rotated and various parameters can be adjusted via the 3D configurator downloaded on the computing device. As discussed above and herein, when configurable item parameters are updated (e.g., when a new pipe is added to a company's inventory, when a new available pipe length is added, when a new item type is added, etc.), the systems and methods discussed herein enable more efficient programming of such parameters at a central location (e.g., creation graph editor) and more efficient dissemination of this updated information to individual applications that are part of the overall system.

According to a first aspect, a method for enabling a user to manipulate product properties in real-time comprising: A) receiving, at a mobile application, a mesh controller graph file and art assets associated with the mesh controller graph file, the mesh controller graph file for displaying visual changes to a particular part; B) receiving, at the mobile application, a unified model graph file, the unified model graph file defining certain editable properties associated with the particular part; and C) receiving, at the mobile application, a user interface (UI) model graph file, the UI model graph file defining visual indicators for visually adjusting the certain editable properties of the particular part, wherein the mobile application associates each of the mesh controller graph file, the unified model graph file, and the UI model graph file with the particular part via a unique identifier.

According to a second aspect, the method of the first aspect or any other aspect, wherein the method further comprises: A) receiving a visual adjustment of at least one of the certain editable properties of the particular part; B) adjusting the at least one of the certain editable properties of the particular part; and C) updating the unified model graph file to reflect the adjustment to the at least one of the certain editable properties of the particular part.

According to a third aspect, the method of the second aspect or any other aspect, wherein the method further comprises, in response to receiving the visual adjustment of the at least one of the certain editable properties of the particular part, updating the mesh controller graph file and adjusting the art assets to reflect the adjustment to the at least one of the certain editable properties of the particular part.

According to a fourth aspect, the method of the third aspect or any other aspect, wherein the method further comprises receiving user login credentials.

According to a fifth aspect, the method of the fourth aspect or any other aspect, wherein the method further comprises, in response to receiving the user login credentials, displaying, at the mobile application, the particular part.

According to a sixth aspect, the method of the fifth aspect or any other aspect, wherein the method further comprises, in response to the selection of the particular part by the user via the mobile application, displaying the particular part in a three-dimensional environment.

According to a seventh aspect, the method of the first aspect or any other aspect, wherein: A) the method further comprises receiving, at the mobile application, an update to the particular part; and B) the update to the particular part comprises an update to a maximum dimension of the particular part.

According to an eighth aspect, the method of the seventh aspect or any other aspect, wherein receiving the update to the particular part comprises receiving an updated unified model graph file for the particular part.

According to a ninth aspect, the method of the eighth aspect or any other aspect, wherein: A) the updated unified model graph file comprises the updated maximum dimension of the particular part; and B) the mobile application associates each of the mesh controller graph file, the updated unified model graph file, and UI model graph file with the particular part via the unique identifier.

According to a tenth aspect, the method of the ninth aspect or any other aspect, wherein the method further comprises: A) receiving a visual adjustment of at least one of the certain editable properties of the particular part; B) adjusting the at least one of the certain editable properties of the particular part to the updated maximum dimension; and C) updating the unified model graph file to reflect the adjustment to the at least one of the certain editable properties of the particular part.

According to an eleventh aspect, a system for enabling a user to manipulate product properties in real-time comprising a remote system operatively connected to a mobile application, wherein the mobile application: A) receives, from the remote system, a mesh controller graph file and art assets associated with the mesh controller graph file, the mesh controller graph file for displaying visual changes to a particular part; B) receives, from the remote system, a unified model graph file, the unified model graph file defining certain editable properties associated with the particular part; and C) receives, from the remote system, a user interface (UI) model graph file, the UI model graph file defining visual indicators for visually adjusting the certain editable properties of the particular part, wherein the mobile application associates each of the mesh controller graph file, the unified model graph file, and the UI model graph file with the particular part via a unique identifier.

According to a twelfth aspect, the system of the eleventh aspect or any other aspect, wherein the mobile application: A) receives a visual adjustment of at least one of the certain editable properties of the particular part; B) adjusts the at least one of the certain editable properties of the particular part; and C) updates the unified model graph file to reflect the adjustment to the at least one of the certain editable properties of the particular part.

According to a thirteenth aspect, the system of the twelfth aspect or any other aspect, wherein the mobile application, in response to receiving the visual adjustment of the at least one of the certain editable properties of the particular part, updates the mesh controller graph file and adjusts the art assets to reflect the adjustment to the at least one of the certain editable properties of the particular part.

According to a fourteenth aspect, the system of the thirteenth aspect, or any other aspect, wherein the mobile application receives user login credentials.

According to a fifteenth aspect, the system of the fourteenth aspect or any other aspect, wherein the mobile application, in response to receiving the user login credentials: A) transmits the user login credentials to a configurable item service (CIS) of the remote system; B) receives the UI model graph file, the unified model graph file, and the mesh controller graph file from the remote system; C) associates each of the mesh controller graph file, the unified model graph file, and the UI model graph file with the particular part via the unique identifier; and D) displays the particular part.

According to a sixteenth aspect, the system of the fifteenth aspect or any other aspect, wherein the mobile application, in response to the selection of the particular part by the user via the mobile application, displays the particular part in a three-dimensional environment.

According to a seventeenth aspect, the system of the eleventh aspect or any other aspect, wherein: A) the mobile application receives an update to the particular part; and B) the update to the particular part comprises an update to a maximum dimension of the particular part.

According to an eighteenth aspect, the system of the seventeenth aspect or any other aspect, wherein receiving the update to the particular part comprises receiving an updated unified model graph file for the particular part.

According to a nineteenth aspect, the system of the eighteenth aspect or any other aspect, wherein: A) the updated unified model graph file comprises the updated maximum dimension of the particular part; and B) the mobile application associates each of the mesh controller graph file, the updated unified model graph file, and UI model graph file with the particular part via the unique identifier.

According to a twentieth aspect, the system of the nineteenth aspect or any other aspect, wherein the mobile application: A) receives a visual adjustment of at least one of the certain editable properties of the particular part; B) adjusts the at least one of the certain editable properties of the particular part to the updated maximum dimension; and C) updates the unified model graph file to reflect the adjustment to the at least one of the certain editable properties of the particular part.

According to a twenty-first aspect, a process for creating a manipulable 3D object comprising: A) providing a 3D visual programming environment for generating 3D objects; B) creating a first creation graph and a second creation graph, each of the first creation graph and the second creation graph defining one or more properties of a particular 3D object by connecting one or more node windows, wherein each of the one or more node windows are connected by node connections between one or more node anchors; C) saving the first creation graph and the second creation graph to a cloud database, the first creation graph and the second creation graph associated with a unique identifier and user credentials; and D) upon receiving the user credentials from a 3D configurator, transmitting the first creation graph and the second creation graph to the 3D configurator, whereby the 3D configurator is configured to define the particular 3D object via the first creation graph and the second creation graph, and to associate the first creation graph and the second creation with the particular 3D object via the unique identifier.

According to a twenty-second aspect, a system for displaying and modifying an item, the system comprising: A) a visual programming system, wherein a user can create one or more graphical files defining properties of a particular item; B) a cloud database operatively connected to the visual programming system for storing the one or more graphical files; and C) an application operatively connected to the cloud database, the application configured for retrieving each of the one or more graphical files defining the properties of the particular item and associating each of the one or more graphical files with a visual representation of the particular item at runtime of the application.

According to a twenty-third aspect, the system of the twenty-second aspect or any other aspect, wherein the visual programming system comprises a creation graph editor including one or more node windows for defining properties of the particular item.

According to a twenty-fourth aspect, the system of the twenty-third aspect or any other aspect, wherein the one or more graphical files comprise one or more of the group comprising a mesh controller graph, a user interface model graph, and a unified model graph.

According to a twenty-fifth aspect, the system of the twenty-fourth aspect or any other aspect, wherein the one or more graphical files comprise a graph for controlling art assets associated with the particular item.

According to a twenty-sixth aspect, the system of the twenty-fifth aspect or any other aspect, wherein the one or more graphical files comprise a graph defining a user interface associated with the particular item, the user interface defining how the particular item may be visually adjusted.

According to a twenty-seventh aspect, the system of the twenty-sixth aspect or any other aspect, wherein the one or more graphical files comprise a graph defining at least one property of the particular item that may be adjusted.

According to a twenty-eighth aspect, a visual programming system comprising: A) a graphical user interface for displaying a creation graph editor; and B) one or more node windows, wherein: 1) each of the one or more node windows comprise node anchors; 2) the one or more node windows are connected by node connections between the node anchors; and 3) the combination of one or more node windows connected by node connections define one or more properties or attributes of a particular item.

According to a twenty-ninth aspect, the visual programming system of the twenty-eighth aspect or any other aspect, wherein: A) a first subset of the combination of one or more node windows define a first property or attribute of the one or more properties or attributes of the particular item; B) a second subset of the combination of one or more node windows define a second property or attribute of the one or more properties or attributes of the particular item; C) the first subset of the combination of one or more node windows comprises a first graph; and D) the second subset of the combination of one or more node windows comprises a second graph.

According to a thirtieth aspect, the visual programming system of the twenty-ninth aspect or any other aspect, wherein the first graph and the second graph are each associated with a unique identifier associated with the particular item.

According to a thirty-first aspect, the visual programming system of the thirtieth aspect or any other aspect, wherein the first graph and the second graph are configured for processing by a 3D configurator application at runtime to define a digital representation of the particular item.

These and other aspects, features, and benefits of the claimed embodiment(s) will become apparent from the following detailed written description of the embodiments and aspects taken in conjunction with the following drawings, although variations and modifications thereto may be effected without departing from the spirit and scope of the novel concepts of the disclosure.

BRIEF DESCRIPTION OF THE DRAWINGS

Further features and benefits of the present disclosure will be apparent from a detailed description of various embodiments thereof taken in conjunction with the following drawings, wherein similar elements are referred to with similar reference numbers, and wherein.

DETAILED DESCRIPTION OF DRAWINGS

Figure 1:
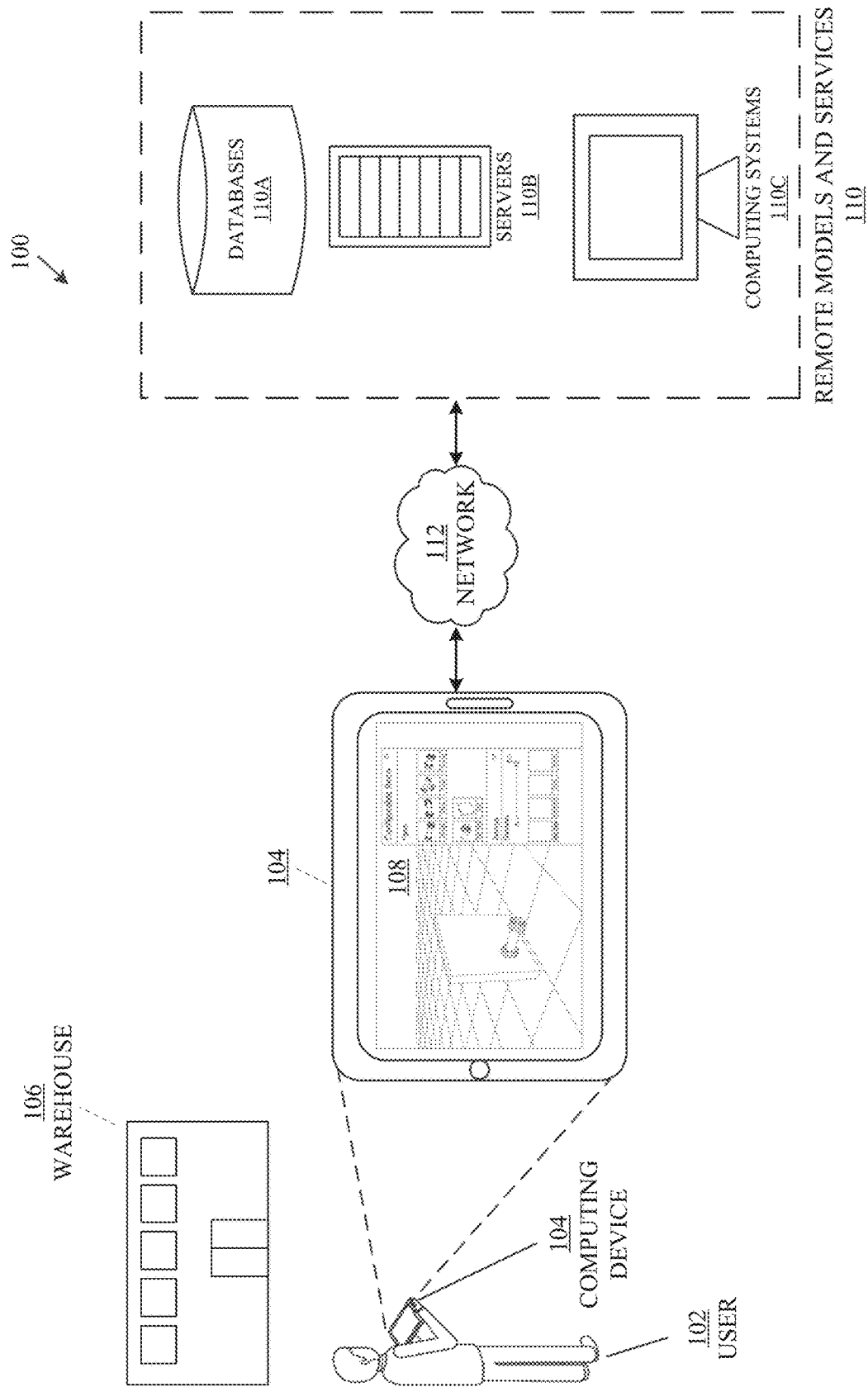
FIG. 1 is an exemplary system environment, according to one aspect of the present disclosure.

The above and further features of the disclosed exemplary systems and methods will be recognized from the following detailed descriptions and drawings of particular embodiments. In various embodiments, the present systems and methods relate generally to systems and methods that enable efficient creation, storage, and updates to item behavior without having to re-render a current three-dimensional configuration or release a new version of the configuration. In particular, in various embodiments, the systems and methods disclosed herein are directed to: 1) an improvement to visual programming systems and methods, which enables the visual organization of predefined portions of functionality and logic to define product behavior; and 2) an improved data solution that stores behavior information in an item agnostic way and enables an application to load and manipulate product properties dynamically at runtime.

The systems and methods disclosed herein may be used within the context of a 3D configurator sales tool (e.g., a mobile application) that allows a user to build and configure 3D items, parts, products, and assemblies "on the fly." Each item, part, object, and/or product may have its own parameters based on a company's inventory, production abilities, the item's own physical constraints, etc. These parameters may be programmed and uploaded to an application from a centralized cloud repository, or other appropriate remote storage system. When these part/product parameters are changed or updated, it may be advantageous to have a system that allows for visual programming and organization of pre-defined portions of functionality, which helps to eliminate modifying the original code base and reduces time and effort by shorting the quality control aspects of these changes (e.g., only the changes need to be run through quality control, not the entire code base). Further, with the disclosed systems and methods, a single application can load updated product properties without the need for a re-download, re-install, or re-render of the application.

The present systems and methods are directed towards improvements to a computer-related technology, namely, a graphical/visual programming system and methods that "split" certain aspects and behaviors of a particular item/part/product into different assets (files) that are separately downloaded and combined by a 3D configurator application. According to some aspects of the present systems and methods, splitting certain aspects and behaviors of a particular item/part/product may allow the properties of the item/part/product to be separately updated without requiring rewrites/edits to the original (and/or entire) code base for the particular item/part/product.

In a particular embodiment, a user may download an application (3D configurator) on a computing device, such as a tablet computer. The user may then, continuing with this embodiment, input certain credentials corresponding to his/her relationship with a certain company or organization. In this embodiment, based on the user's credentials, the user is granted access to certain configurable items that are pre-configured with certain adjustable parameters. Further, in this embodiment, the 3D configurator may automatically download (or receive for download) the certain configurable items for which the user has been granted access. As discussed herein, enabling the user access to certain configurable items via credentials (through the unique architecture, systems, and methods disclosed herein) is an improvement over systems wherein the user has to download a new instance/update of the 3D configurator application each time the configurable items are updated (e.g., the user is granted access to a new item or pre-configured item dimensions are changed).

Furthermore, once a user has logged into a 3D configurator and the 3D configurator has granted the user access to various configurable items (as discussed immediately above), the user can build an assembly "on the fly" and pre-loaded parts can be rotated and various parameters can be adjusted via the 3D configurator downloaded on the computing device. As discussed above and herein, when configurable item parameters are updated (e.g., when a new pipe is added to a company's inventory, when a new available pipe length is added, when a new item type is added, etc.), the systems and methods discussed herein enable more efficient programming of such parameters at a central location (e.g., creation graph editor) and more efficient dissemination of this updated information to individual applications that are part of the overall system.

Referring now to the drawings, FIG. 1 is an exemplary system environment 100, according to one aspect of the present disclosure. In various embodiments, the systems and methods discussed herein may be implemented as a tool (or system or method), via a mobile application, for allowing real-time design, configuration, visualization, price quoting, etc., of physical items (e.g., pipes or other industrial equipment). In particular, the present systems and methods allow for a user to visually represent a plurality of physical items in a three-dimensional space, configure the plurality of physical items to meet various specifications, design needs, physical constraints, etc., and furthermore receive real-time quote analysis corresponding to the visually represented plurality of items (e.g., quotes for cost, development time, estimated workforce, etc.). According to various aspects of the present disclosure, the system may be implemented in a digital environment (such as on an iPad or other similar mobile computing device), or the system may be implemented in a virtual/augmented reality (AR/VR) environment. As such, a user of the system may remotely configure a plurality of items to be installed at a separate location, or the user may visit the installation location and visually build the plurality of items, via AR/VR, to accommodate the space detected by the AR/VR supported devices.

In a particular embodiment, the exemplary system environment 100 depicts a user 102 holding a computing device 104 at a warehouse 106. In certain embodiments, the user 102 may be a sales representative, and the computing device 104 may be a mobile computing device such as a tablet, smart phone, or any other appropriate device. According to various aspects of the present disclosure, the user 102 may be at the warehouse 106 for scouting the warehouse 106 location and floorplan for designing and quoting a new piping system. In various embodiments, the computing device 104 is operable to run a 3D configurator application 108 (also sometimes referred to herein as a "3D configurator" and "application") for visually displaying the new piping system in real-time. As shown in the present embodiment, the 3D configurator 108 displays the current configuration of the piping system, as well as the available pipe related items (e.g., elbows, T-pipes, end caps, etc.) to add to the currently configured pipe(s). As will be described in greater detail in association with FIGS. 6-10, additional "Configurable Items" or objects from a user interface toolbar of the 3D configurator 108 may be selected by the user 102, and the selected objects may be introduced into the digital environment of the 3D configurator. In certain embodiments, the selected objects/items in the 3D configurator 108 may be visually changed (e.g., rotated, extended, etc.) based on the user's desired configuration or particular limitations, constraints, or requirements for the current configuration (e.g., piping system or the like). In particular embodiments, as the user 102 introduces objects into the 3D configurator, aspects of the system operating in conjunction with the 3D configurator 108, such as remote models and services 110, may respond to the newly introduced or configured objects/items.

In one embodiment, the remote models and services 110 are connected to the user's computing device 104 over a network 112, and may include various components such as databases 110A, servers 110B, and other computing systems 110C. According to various aspects of the present disclosure, the remote models and services 110 support the 3D configurator 108, such that the visual elements shown on the 3D configurator 108 are received from the remote models and services 110 during an initial logon/setup process, and as the user 102 continues to introduce and adjust configurable items.

For example, consider a scenario where the user 102 is at the warehouse 106 for evaluating the warehouse 106 for a piping system. The user 102 may enter his/her login credentials into the mobile device 104 for launching the 3D configurator 108. In various embodiments, in response to the user 102 providing his/her credentials, the credentials may be transmitted to the remote models and services 110, via the network 112, for accessing one or more graph files that define behavior such as: 1) what items (e.g., pipes) are available to the user 102 for configuring the pipe system at the warehouse 106, and furthermore the constraints for those items and how they may be configured/manipulated; 2) how the available items are to be displayed within the 3D configurator user interface ("UI"); and 3) how changes to the items in the 3D configurator 108, such as a user 102 changing the length of a particular pipe, affect other items in the 3D configurator, potential items to be introduced into the 3D configurator, pricing quotes for the current item configuration, etc. As will be understood from discussions herein, the system may further locally store the items (e.g., pipes), constraints, display attributes, and the like upon user 102 logging in to the system.

In general, graph files are data objects created for defining relationships between particular items in a network, code, or general system, where each relationship may be represented as connected nodes, where each node may include logic relating to particular inputs, other nodes, external services, etc. According to various aspects of the present disclosure, the graph files discussed herein may be visually programmed via a graph editor. For example, using a graph editor to modify a graph file may allow for a user to introduce a new element into a graph file, such as a new pipe component, by adding a new node to the graph file via the graph editor. In various embodiments, using a graph editor removes the need for manual programming and may promote a more "plug-and-play" environment because the functionality of the system is reliant on properly established relationships between nodes, rather than small details in code.

According to particular embodiments, the graph editor (to be described herein) presents a visual scripting editor that can be used to define item behaviors. In one or more embodiments, item behaviors are defined by three different resources, each created separately via the graph editor. In particular embodiments, the graph editor allows a user to split item behaviors into two or more (e.g., three) different resources, which can then be updated separately (instead of updating all code in an application) and transmitted separately to the 3D configurator 108 (for efficiency). As further discussed below, in various embodiments, an item/item/part/product is defined by: 1) a unified model; 2) a UI model; and 3) a mesh controller, each of which will be discussed in further detail. Each of these resources is combined by the 3D configurator 108 using a common item/item/part/product identifier (discussed below) to control the various aspects the item/item/part/product behavior.

Figure 2:
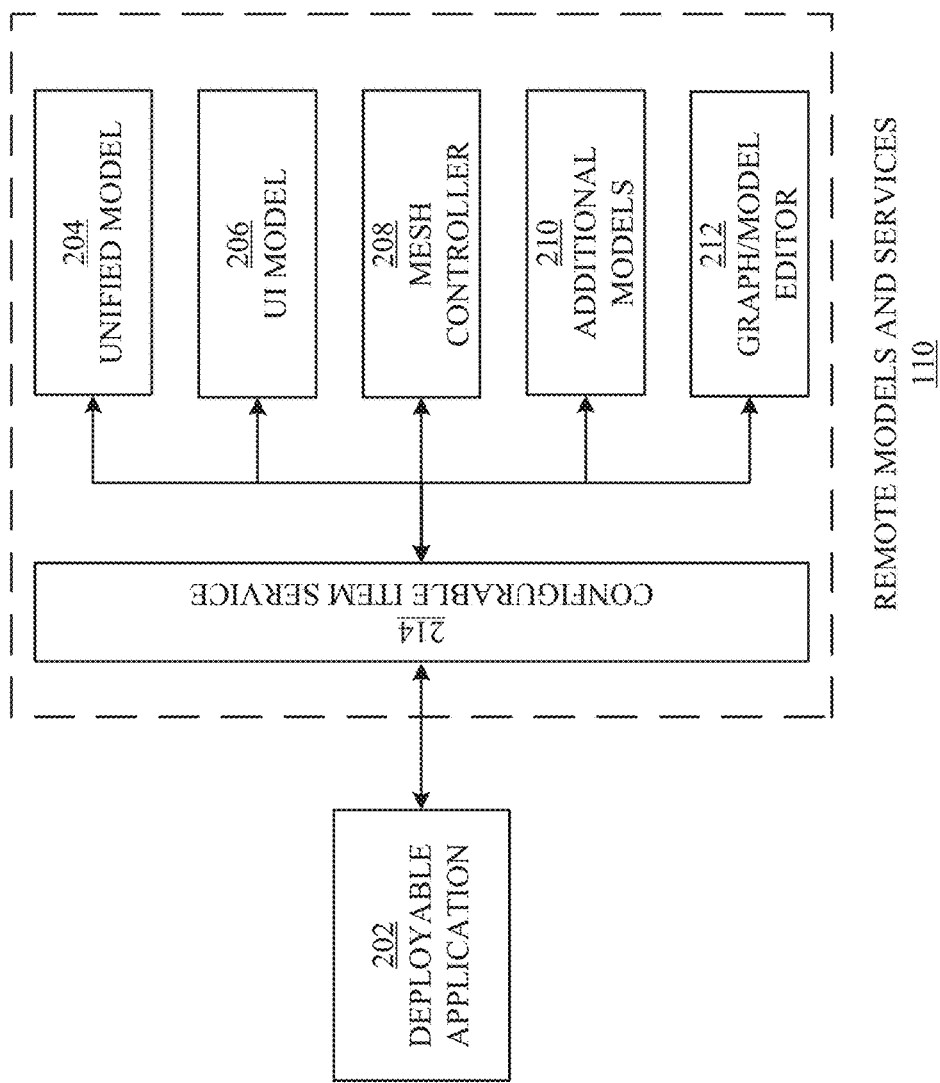
FIG. 2 is an exemplary system diagram, according to one aspect of the present disclosure.

Turning now to FIG. 2, an exemplary architecture diagram 200 is shown, according to one aspect of the present disclosure. As shown in the present embodiment, a deployable application 202 (such as the 3D configurator 108) is shown operatively connected to the remote models and services 110. In the present embodiment, the one or more models of the remote models and services 110 include a unified model 204, a UI model 206, a mesh controller 208, or any number of additional models 210. In various embodiments, the remote models and services 110 may also include a graph/model editor 212 for creating and/or modifying the one or more models. According to various aspects of the present disclosure, the unified model 204, the UI model 206, and the mesh controller 208 are each graph files created by a system administrator (or the like) via a graph editor 212.

According to various embodiments, the unified model 204 defines the various properties and behaviors associated with an item, and provides a data-driven solution to allow the UI model 206 and mesh controller 208 to communicate with each other. In some embodiments, the unified model 204 defines item properties, such as dimensions (e.g., a pipe can be between 4 inches and 4 feet in length and have a diameter of 2 inches or 4 inches).

According to particular embodiments, the UI model 206 defines the user interface associated with an item and how an item is displayed by the 3D configurator 108 (e.g., text boxes, graphic sliders, etc.). In some embodiments, the user interface is driven by the unified model 204 and updates the item data. Available UI elements can be added to a UI model 206 graph (e.g., graph file) through pre-defined nodes via the graph editor 212. In one or more embodiments, the UI model 206 is used by a 3D configurator application 108 at runtime to generate the UI for a selected item. In particular embodiments, the UI model 206 defines user-adjustable features of a visual representation of a particular item/item/part/product.

For example, a node in a graph editor 212 (as discussed below) may define a user-interface element that a user may interact with. Continuing with this example, a node of the UI model 206 for a particular item/part/product defines a user-selectable slider that can be configured to adjust a length of an item/part upon selection by a user (e.g., a user selects a slider and "drags" the slider on a screen of a computing device to visually increase the length of the part). At runtime, in this example, the 3D configurator 108 converts the node instructions to the slider on the screen of a tablet, which, when selected by the user, enables the user to adjust the length of the part.

In particular embodiments, the mesh controller 208 is built in association with an item's 3D art and is used to define how the item's properties drive its 3D representation. In various embodiments, the mesh controller 208 is a graph (e.g., a graph file) created separately from the UI model 206 and unified model 204 graphs and defines how a particular item/item/part/product is visually displayed (e.g., the color of the item/item/part/product, how the item/item/part/product appears when the length is increased, etc.).

As will be understood from discussions herein, in various embodiments, each item/part/product also has its own art resources, which define color and other visual aspects of how the item/part/product is visually rendered on a 3D configurator application 108. In some embodiments, the art resources for a particular item/part/product are associated with an identifier for a particular item/part/product and separately transmitted to the 3D configurator application 108. In these embodiments (and others), the art resources are manipulated (visually) via interaction by the user with the UI elements defined within the UI model 206 and coordination between the UI model 206, unified model 204 and mesh controller 208. In particular embodiments, the UI model 206 modifies data in the unified model 204, which will then trigger the mesh controller 208 to update.

In one embodiment, the remote models and services 110 may include a configurable item service 214 ("CIS"), where the CIS 214 is a service for receiving user credentials from the deployable application 202, and in return transmitting to the deployable application 202 one or more graph files that correspond to the user credentials. For example, the CIS 214 may determine that a user's login credentials may be associated with a particular unified model 204, and thus the CIS 214 controls which objects or items are available to that user for building within the 3D configurator 108. In one embodiment, the 3D configurator 108 may authenticate the user's credentials (e.g., at the CIS 214). The 3D configurator 108, in this example, may fetch the mesh controller 208, UI model 206, unified model 204, and art assets for parts/products to which the user has access and downloads these to the 3D configurator 108. As will be understood from discussions herein, each item/part/product is given a unique identifier (ID) and the mesh controller 208, UI model 206, and unified model 204 are each identified by a corresponding unique ID.

Figure 3:
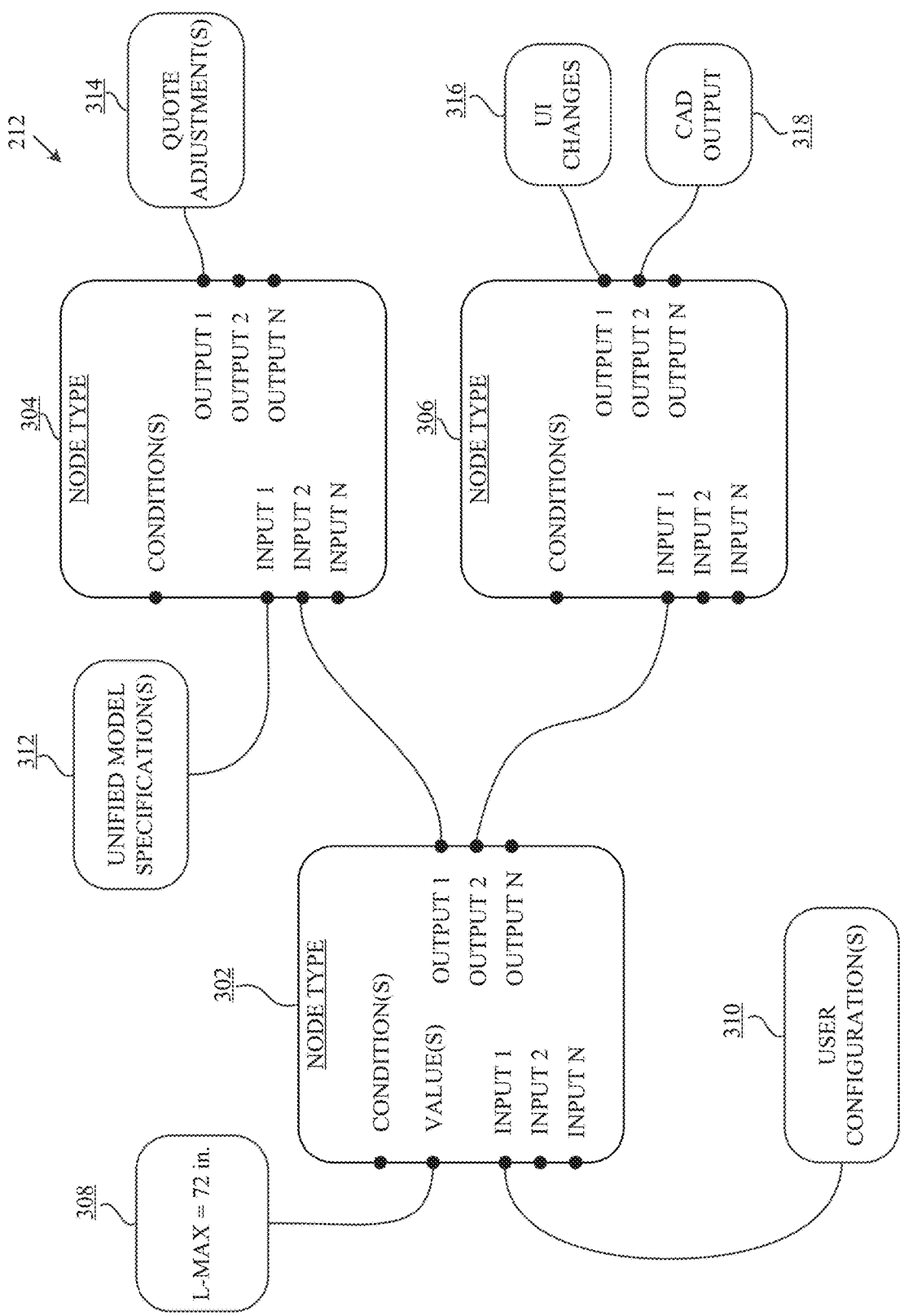
FIG. 3 is an exemplary graph file editor, according to one aspect of the present disclosure.

In a particular embodiment, FIG. 3 is a diagram illustrating exemplary functionality of a graph editor 212. As mentioned above in the discussion of FIG. 2, the remote models and services 110 may include a graph/model editor 212 for creating and/or modifying the one or more models included therein. As shown in the present embodiment, the exemplary graph editor 212 provides a visual programming tool for determining object/item behavior, configuring pricing, determining changes to the UI, and generally creating relationships between various system components and assets. According to various aspects of the present disclosure, the exemplary graph editor 212 allows for administrators (or users) of the system to visually program behavior of the 3D configurator via connecting a plurality of nodes where each node represents a portion of logic (defined by backend code). In the present embodiment, three nodes are represented; however, it should be understood that any appropriate number of nodes may be instantiated for defining particular product behaviors.

As shown in the present embodiment, the exemplary graph editor 212 includes three nodes, 302, 304, and 306, where each node may be of a particular type. In various embodiments, node types are determined by the logic they represent. For example, some nodes may represent a logical "else" statement, where other nodes may represent more complex "if-then" statements (e.g., IFTTT). In particular embodiments, each node in the exemplary graph editor 212 may include one or more inputs, or input anchors, for accepting data from other nodes, other system components, etc. According to various aspects of the present disclosure, each node may also be configured with predetermined "conditions" and/or "values," which may be evaluated against the one or more inputs. In various embodiments, the "condition(s)" element may allow for a user to select (from predefined conditions) or manually define certain logical tests to operate on the node inputs. In response to evaluating the one or more inputs and/or conditions and values, the one or more nodes may generate one or more outputs, which may serve as inputs to additional nodes, or may provide direct changes or adjustments to the system.

According to various aspects of the present disclosure, the node 302 is associated with a constant value 308, "L-MAX=72 in.," where L-MAX is a maximum length allowed for a particular pipe in a particular industrial piping configuration (for example purposes only). In certain embodiments, the L-MAX value may be hard-coded or otherwise predetermined for being compared to or evaluated against particular node inputs, such as the user configuration(s) input 310. In one embodiment, the user configuration(s) 310 may include a request for extending or rotating various items on the 3D configurator 108, or other similar signals. According to the present embodiment, the logic of the node 302 may evaluate the user configuration 310 against the constant value 308 to determine if the user configuration 310 input is valid and acceptable, according to the predefined constraints (e.g., L-MAX=72 in.). According to various aspects of the present disclosure, if the user configuration 310 complies with the constant value 308, the node 302 may generate one or more outputs to be accepted by one or more additional nodes.

Continuing with FIG. 3, the one or more outputs from the node 302 may be accepted as inputs into both nodes 304 and 306. In the present embodiment, the node 304 also accepts unified model specification(s) 312 as an input. As discussed above in association with FIG. 2, the unified model may define particular configurable items (e.g., pipes) according to their characteristics, limitations, availability, costs, etc. As such, the node 304 may have access to the unified model data for the items that correspond to the user configuration(s) 310. According to various aspects of the present disclosure, the node 304 may compare these unified model specifications 312, such as a price per inch, to the node 302 output (e.g., a particular pipe configuration) and furthermore output a generated quote adjustment 314. In various embodiments, the quote adjustment 314 may be a price that reflects the user configuration(s) 310 and allows for the user to design his/her desired piping configuration "on the fly" while receiving real-time quote adjustments 314 that reflect the current configuration.

In one embodiment, the node 306 may also receive, as an input, the output from the node 302. According to various aspects of the present disclosure, the node 306 may receive various node inputs, such as inputs from software engines (e.g., a rules engine) or other system components that include remote logic. In certain embodiments, these engines may include remote logic or rules for predefined outcomes based on particular inputs (e.g., pipe sizes). For example, if the user configuration(s) 310 includes data for elongating a pipe to 70 inches, a rules engine may include logic that determines a series of workflow actions, such as manipulating the user interface (UI changes 316) to show the elongated pipe as well as showing modified accompanying pipes to accommodate the user configuration(s) 310. In some embodiments, the node 306 may output a request for transforming the current status of the 3D configurator 108 to a CAD service 318. In various embodiments, the CAD service 318 may transform the 3D configurator 108 data into a workable CAD format that may be used for generating files required to manufacture the configured parts/items.

Figure 4:
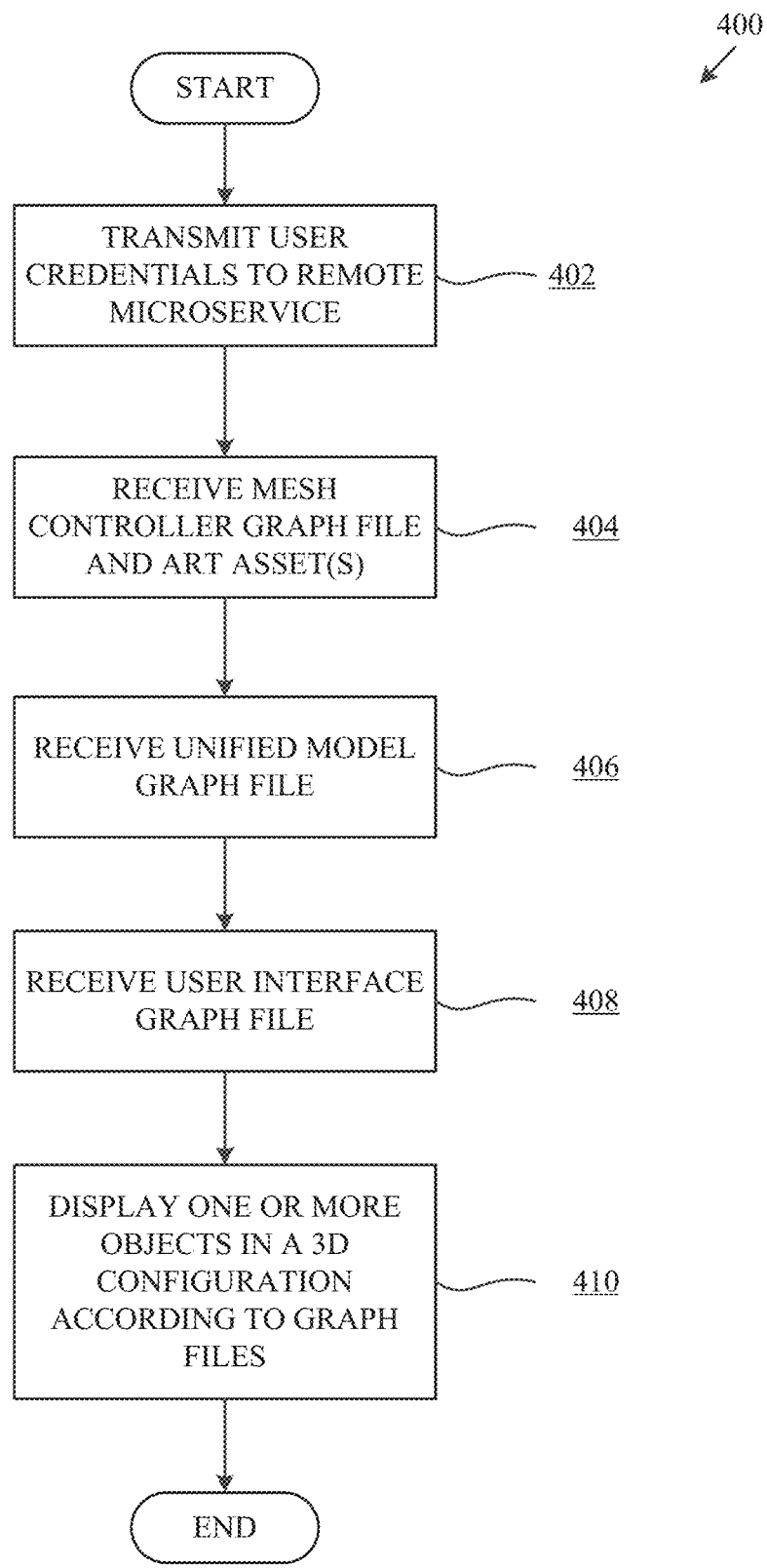
FIG. 4 is an exemplary flowchart, according to one aspect of the present disclosure.

Turning now to FIG. 4, a flowchart is shown illustrating an exemplary system setup process 400, according to one aspect of the present disclosure. In one embodiment, the process 400 begins at step 402, where the computing device transmits user credentials to a remote microservice. According to various aspects of the present disclosure, the remote microservice may be the configurable item service (CIS) 214 discussed above in association with FIG. 2. In various embodiments, the CIS 214 determines which graph files and models a user may have access to, and what aspects within those graph files and models the user may use within the 3D configurator 108. In particular embodiments, the CIS 214 may receive some or all of the graph files and furthermore store the graph files for efficient access by the computing device 104, to be used by the 3D configurator 108.

At step 404, and in response to transmitting the user credentials to the CIS 214 at step 402, the computing device 104 may receive a mesh controller graph file and corresponding art asset(s) from the CIS 214. As mentioned above in the discussion of FIG. 2, the mesh controller graph file is a data object created with associated 3D art assets for defining how a particular item's properties are represented in a 3D configuration (e.g., how a pipe appears when the length is extended).

In one embodiment, at step 406, the computing device 104 may receive a unified model graph file. In various embodiments, the unified model graph file may define the various properties and behaviors associated with the items available to the user, based on his/her credentials. For example, the unified model graph file may define item properties such as a pipe having an available length between 4 inches and 4 feet, and also a diameter between 2 inches and 4 includes.

In a particular embodiment, at step 408, the system may receive a user interface graph file. In various embodiments, the user interface graph file determines how the items included in the unified model graph file are presented to the user. For example, the unified model graph file may define a pipe available at various lengths and various materials, and the user interface graph file may determine how the various lengths and materials are presented to the user. Continuing with this example, the user interface graph file may determine that the various lengths be presented via a slide-bar, and that the various materials be presented via a visual "swatch," or the like.

According to various aspects of the present disclosure, at step 410, the system may display the one or more objects in a 3D configuration according to the received graph files. According to various aspects of the present disclosure, in response to receiving the graph files (from steps 404, 406, and 408), the 3D configurator at the computing device 104 may visually display the graph file contents. For example, the user may have a pre-saved configuration that was loaded via the mesh controller, which includes various items defined within the unified model graph file, and is displayed according to the user interface model graph file.

Figure 5:
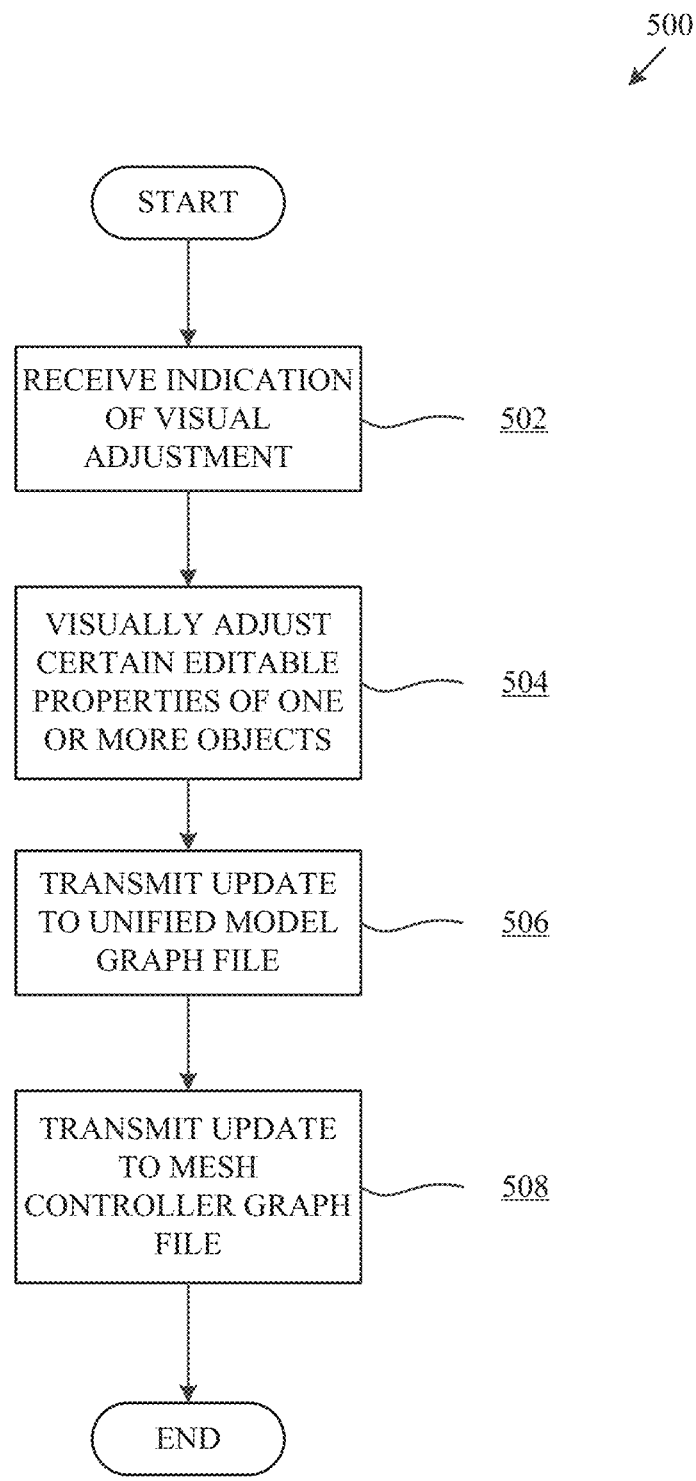
FIG. 5 is an exemplary flowchart, according to one aspect of the present disclosure.

Referring now to FIG. 5, a flowchart is shown illustrating an exemplary system update process 500. In one embodiment, at step 502 the system receives a request for visual adjustment of one or more items in the 3D configurator 108. According to various aspects of the present disclosure, the requests received at step 502 may be initiated in response to a user extending, rotating, rearranging, etc., a particular item within the 3D configurator 108, or in response to the user adding or removing a particular item within the 3D configurator 108. In some embodiments, the 3D configurator 108 may be operated in an augmented reality or virtual reality environment ("AR/VR"), and changes within those environments may also initiate the request received at the step 502.

At step 504, according to one embodiment, the 3D configurator 108 may visually adjust the certain editable properties of the one or more adjusted items from step 502. In certain embodiments, the 3D configurator 108 may also visually adjust related items, such as adjusting a pipe cap if the diameter of the pipe was modified.

In one embodiment, at step 506, the adjustments and updates from step 504, as received at step 502, are transmitted to (or saved as) the unified model graph file. In particular embodiments, the unified model graph file may store a version of the current configuration displayed in the 3D configurator 108. Accordingly, and in various embodiments, changes or updates to items shown in the 3D configurator 108 may initiate the update to the unified model graph file.

At step 508, the adjustments and updates are further transmitted to the mesh controller graph file. According to various aspects of the present disclosure, the mesh controller graph file may coordinate the length of the particular part with the art assets to then visually change the way the particular 3D art appear on the user 3D configurator 108.

Figure 6:
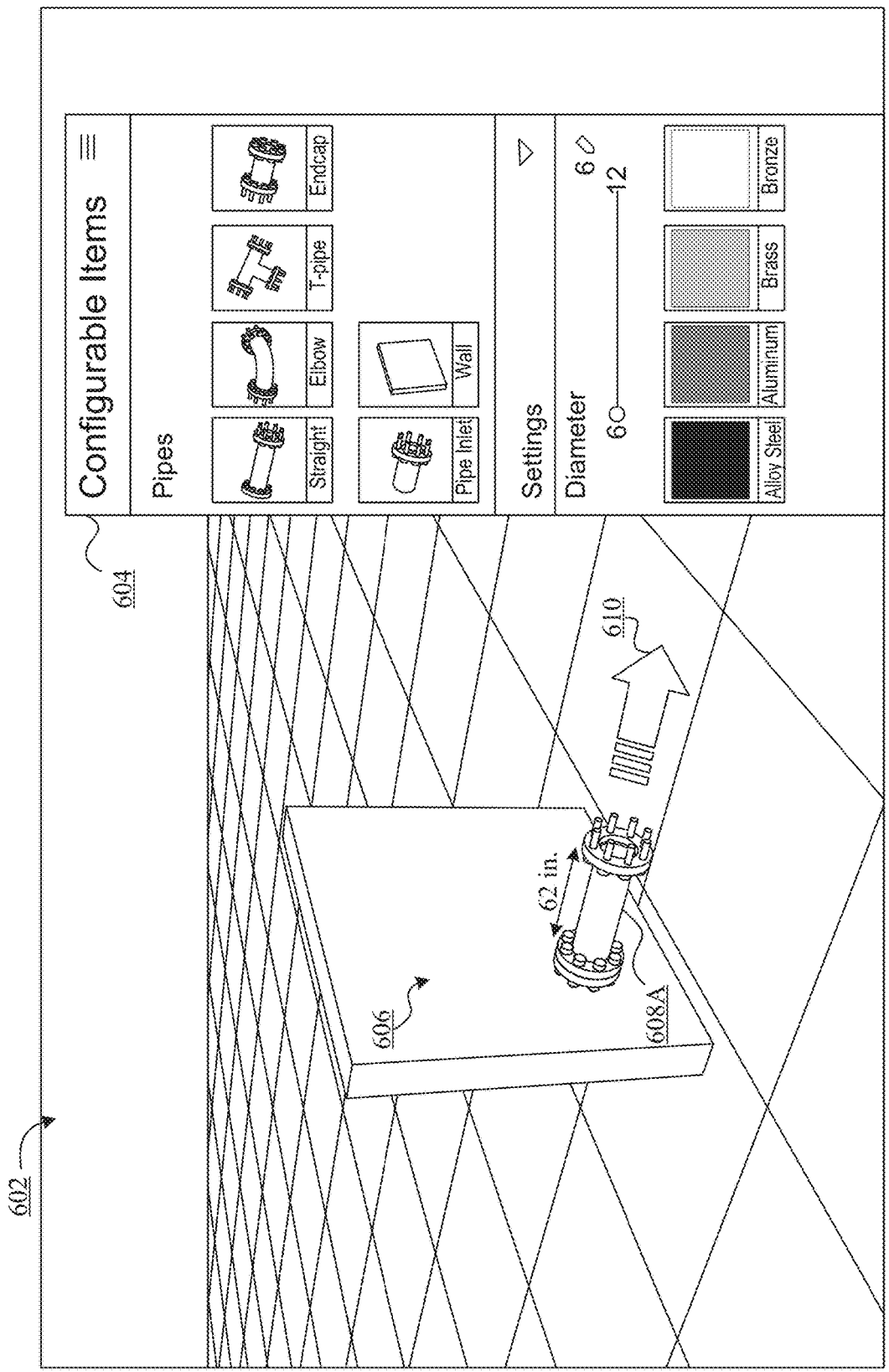
FIG. 6 is an exemplary view of a 3D configurator application, according to one aspect of the present disclosure.

Reference will now be made to FIGS. 6-10, which illustrate, according to various embodiments, the 3D configurator application and its exemplary functionality. Referring first to FIG. 6, the 3D configurator application is shown including a 3D environment 602 with a user interface (UI) 604, and a current build configuration 606. As mentioned throughout the present disclosure, a unified model may define items/objects available to particular users (based on their credentials) for visually building 3D configurations from those items/objects. In one embodiment, the user interface 604 may be supported by the UI model, where the UI model may define how the available items/parts are displayed to the user of the 3D configurator application.

Continuing with FIG. 6, a pipe 608A is shown in the current build configuration 606 as having a length of 62 inches. In various embodiments, the 3D configurator application may include visual indicators or icons representing the ability to modify or adjust certain items within the 3D configurator application. For example, as shown in the present embodiment, an extension arrow 610 is located near the pipe 608A indicating that the pipe is extendable. As will be understood, other available functionality may be indicated by other icons within the 3D configurator.

Figure 7:
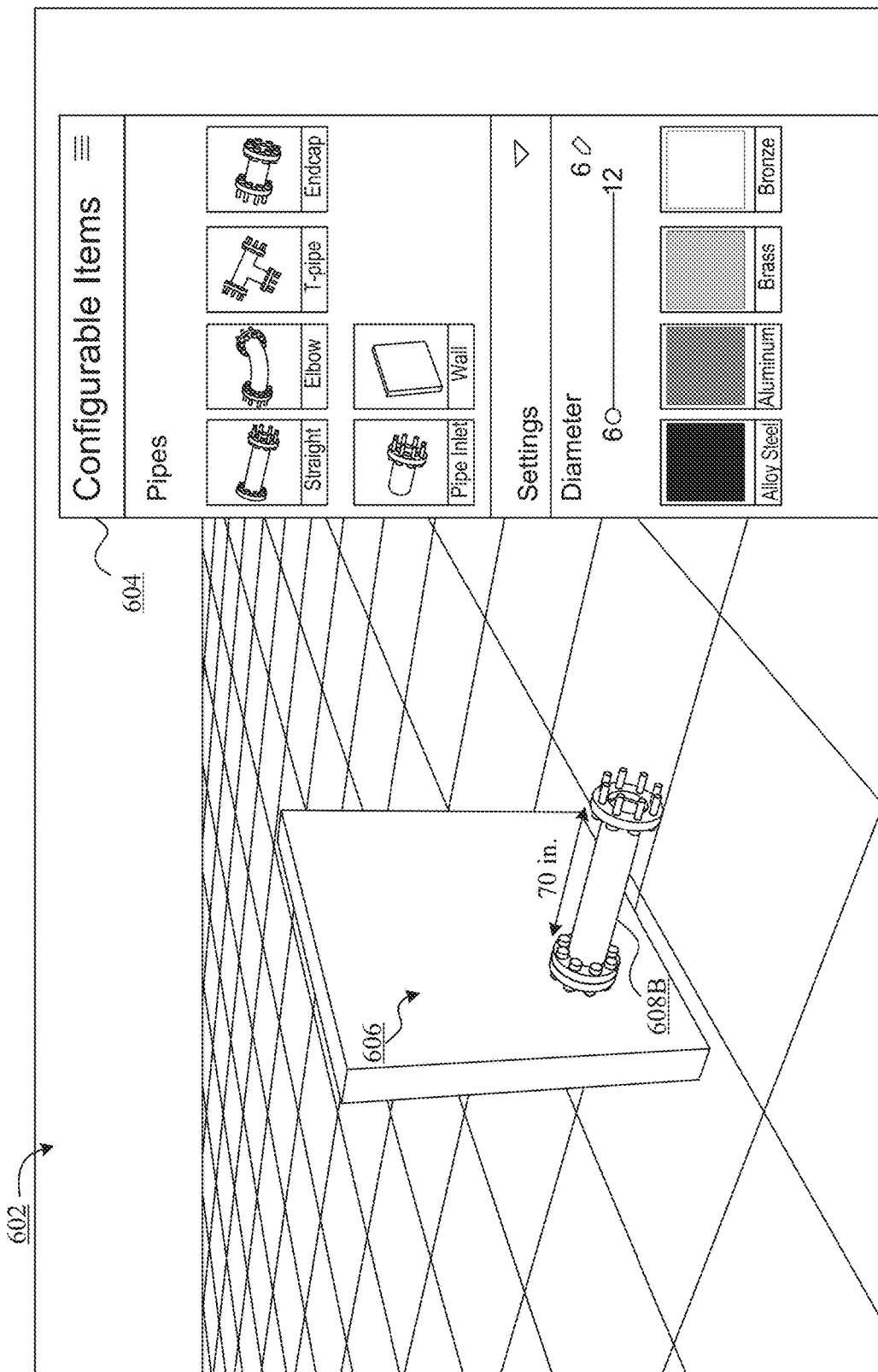
FIG. 7 is an exemplary view of a 3D configurator application, according to one aspect of the present disclosure.

Turning now to FIG. 7, a pipe 608B is shown in the build configuration 606 including a length of 70 inches. According to various aspects of the present disclosure, the pipe 608B may be an extended version of the pipe 608A, where the pipe 608B is extended as a result of a user of the 3D configurator to extend the pipe. In certain embodiments, the user may select to extend the pipe 608B by clicking and dragging an end of the pipe, moving a curser along a slide bar, manually entering the desired length, selecting from a predetermined set of available lengths, etc.

Figure 8:
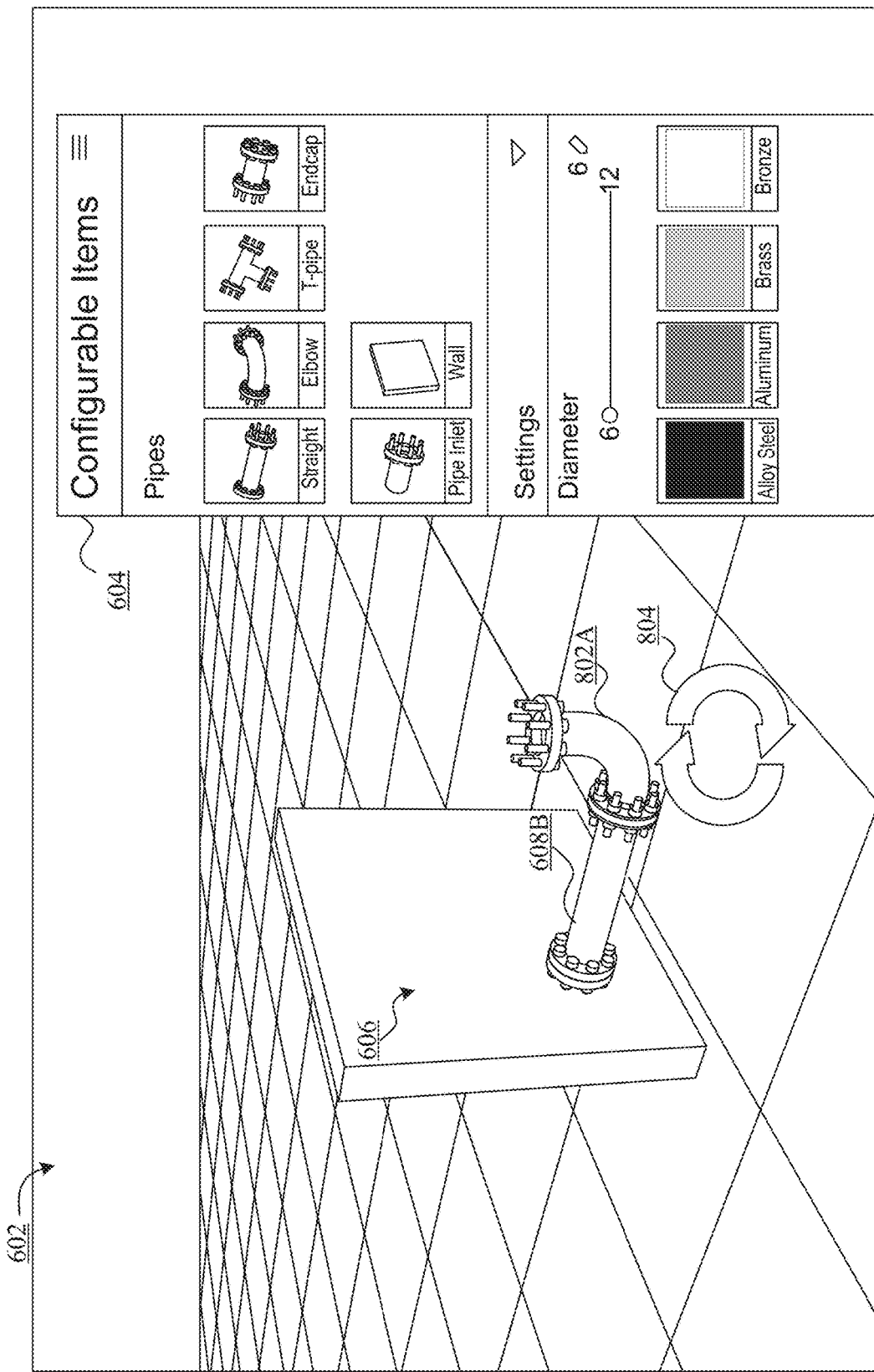
FIG. 8 is an exemplary view of a 3D configurator application, according to one aspect of the present disclosure.
Figure 9:
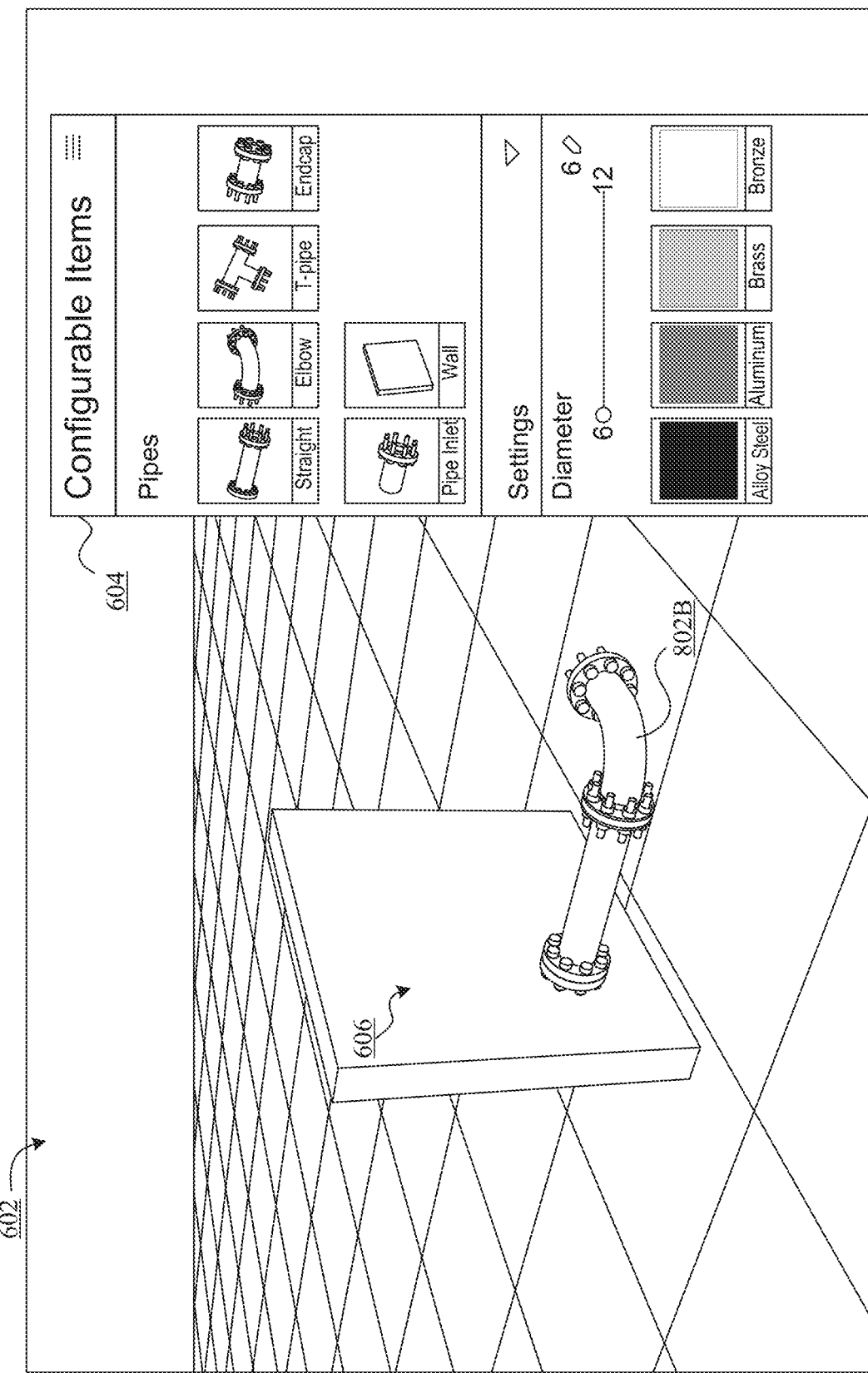
FIG. 9 is an exemplary view of a 3D configurator application, according to one aspect of the present disclosure.

According to various embodiments, and as shown in FIG. 8, a user of the 3D configurator application may add additional items to the build configuration 606. In one embodiment, FIG. 8 includes a pipe elbow 802A connected to the pipe 608B. Similar to the extension arrow 610 shown in FIG. 6, a pair of rotational arrows 804 are shown in the present embodiment for indicating that the pipe elbow 802A may be rotated in various configurations or orientations. In some embodiments, a default configuration of the pipe elbow 802A is pointed in an upwards orientation. In various embodiments, a user of the 3D configurator may toggle the available options for rotating the pipe 802A before selecting a final orientation, which is shown as 802B in the embodiment illustrated in FIG. 9.

Figure 10:
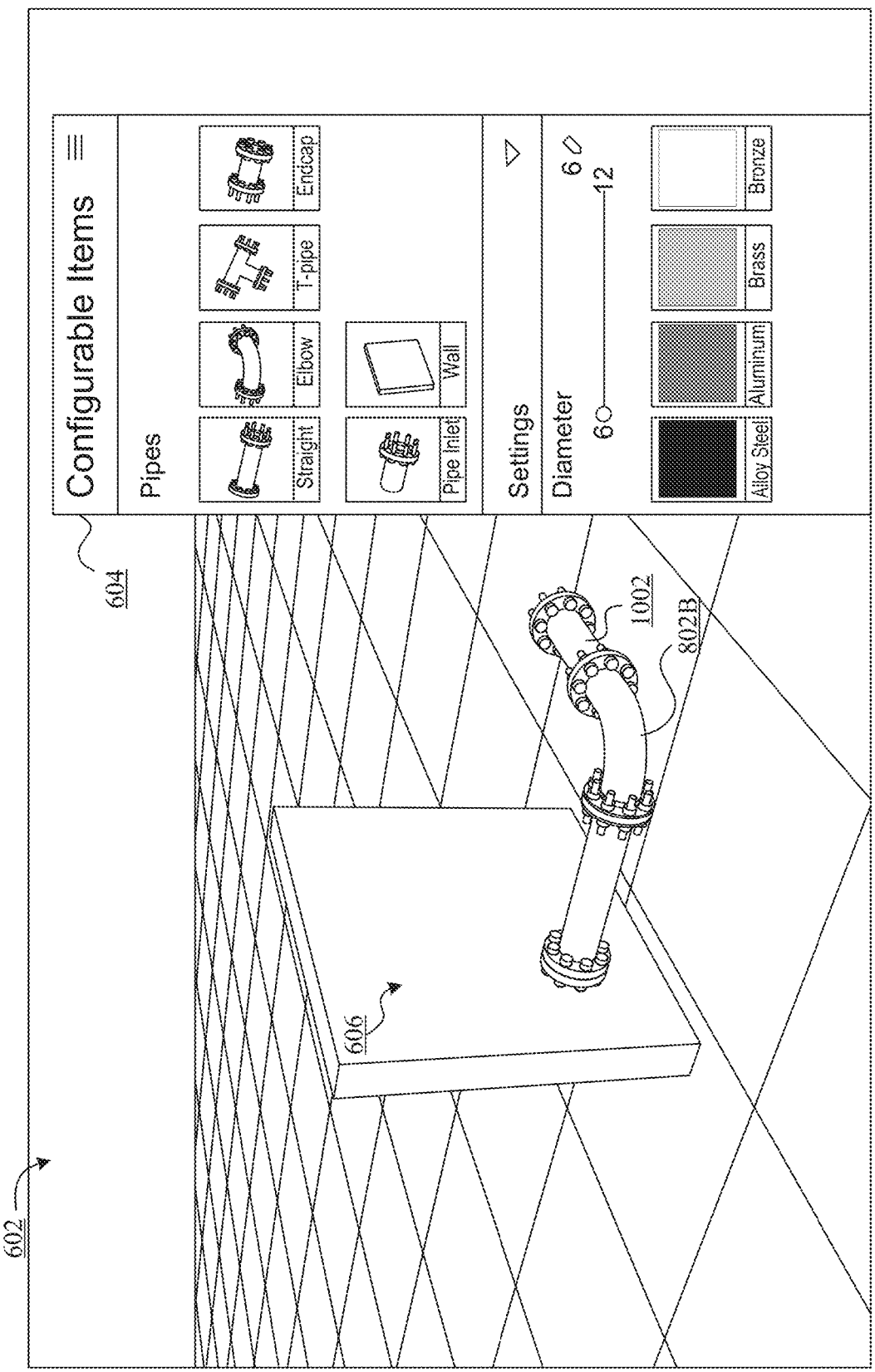
FIG. 10 is an exemplary view of a 3D configurator application, according to one aspect of the present disclosure.

In various embodiments, FIG. 10 illustrates the ability for a user of the 3D configurator to continue to add to and modify the items within the build configuration. As shown in the present embodiment, an additional pipe 1002 is added to the pipe elbow 802B. In particular embodiments, and as described in association with the pipe 608A, the additional pipe 1002 may be extended (or shortened) to meet the requirements of the user operating the 3D configurator application.

Additional Exemplary Architecture
Details/Embodiments

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable nonvolatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Alternate Embodiments

As will be understood from discussions herein, the present systems and methods contemplate different embodiments not specifically described herein. For example, properties related to a particular product/part may be split into a number of components not discussed herein. For example, properties of a particular part/product may be split into less than three (e.g., two) or more than three (e.g., 4-10) different graphs or files.

As will be understood, the systems, methods, and processes discussed herein are not limited to pipes, pipe assemblies, or the like. Rather, various embodiments of the present systems and methods related generally to visual programming techniques and systems for disseminating data to mobile applications that can be used in many industries. For example, the visual programming embodiments discussed herein may be used for changing parameters of any suitable items or objects of a system (for example, parts related to manufacturing, automotive, and airline industries) and other programmable software objects, such as, for example, items or characters of a video game, dimensions or parameters of subsystems (e.g., utility subsystems that are part of a greater overall system), parameters of construction systems (e.g., building parameters, part parameters, location parameters, parameters of substructures, parameters of towers, utility lines, etc.) and the like. Similarly, the data dissemination architecture, techniques, systems, and processes are likewise applicable to any system where application updates may be necessary (not necessarily only part updates).

CONCLUSION

Aspects, features, and benefits of the claimed invention(s) will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A method for enabling a user to manipulate product properties in real-time comprising:
receiving, at a mobile application, a mesh controller graph file and art assets associated with the mesh controller graph file, the mesh controller graph file for displaying visual changes to a particular part;
receiving, at the mobile application, a unified model graph file, the unified model graph file defining certain editable properties associated with the particular part;
receiving, at the mobile application, a user interface (UI) model graph file, the UI model graph file defining visual indicators for visually adjusting the certain editable properties of the particular part, wherein the mobile application associates each of the mesh controller graph file, the unified model graph file, and the UI model graph file with the particular part via a unique identifier;
receiving, at the mobile application, an updated unified model graph file comprising an updated maximum dimension of the particular part; and
associating, at the mobile application, each of the mesh controller graph file, the updated unified model graph file, and the UI model graph file with the particular part via the unique identifier.

2. The method of claim 1, wherein the method further comprises:
receiving a visual adjustment of at least one of the certain editable properties of the particular part;
adjusting the at least one of the certain editable properties of the particular part; and
updating the unified model graph file to reflect the adjustment to the at least one of the certain editable properties of the particular part.

3. The method of claim 2, wherein the method further comprises, in response to receiving the visual adjustment of the at least one of the certain editable properties of the particular part, updating the mesh controller graph file and adjusting the art assets to reflect the adjustment to the at least one of the certain editable properties of the particular part.

4. The method of claim 3, wherein the method further comprises receiving user login credentials.

5. The method of claim 4, wherein the method further comprises, in response to receiving the user login credentials, displaying, at the mobile application, the particular part.

6. The method of claim 5, wherein the method further comprises, in response to the selection of the particular part by the user via the mobile application, displaying the particular part in a three-dimensional environment.

7. The method of claim 1, wherein the method further comprises:
- receiving a visual adjustment of at least one of the certain editable properties of the particular part;
- adjusting the at least one of the certain editable properties of the particular part to the updated maximum dimension; and
- updating the unified model graph file to reflect the adjustment to the at least one of the certain editable properties of the particular part.

8. A system for enabling a user to manipulate product properties in real-time comprising a remote system operatively connected to a mobile application, wherein the mobile application:
- receives, from the remote system, a mesh controller graph file and art assets associated with the mesh controller graph file, the mesh controller graph file for displaying visual changes to a particular part;
- receives, from the remote system, a unified model graph file, the unified model graph file defining certain editable properties associated with the particular part;
- receives, from the remote system, a user interface (UI) model graph file, the UI model graph file defining visual indicators for visually adjusting the certain editable properties of the particular part, wherein the mobile application associates each of the mesh controller graph file, the unified model graph file, and UI model graph file with the particular part via a unique identifier;
- receives an updated unified model graph file comprising an updated maximum dimension of the particular part; and
- associates each of the mesh controller graph file, the updated unified model graph file, and the UI model graph file with the particular part via the unique identifier.

9. The system of claim 8, wherein the mobile application:
- receives a visual adjustment of at least one of the certain editable properties of the particular part;
- adjusts the at least one of the certain editable properties of the particular part; and
- updates the unified model graph file to reflect the adjustment to the at least one of the certain editable properties of the particular part.

10. The system of claim 9, wherein the mobile application, in response to receiving the visual adjustment of the at least one of the certain editable properties of the particular part, updates the mesh controller graph file and adjusts the art assets to reflect the adjustment to the at least one of the certain editable properties of the particular part.

11. The system of claim 10, wherein the mobile application receives user login credentials.

12. The system of claim 11, wherein the mobile application, in response to receiving the user login credentials:
- transmits the user login credentials to a configurable item service (CIS) of the remote system;
- receives the UI model graph file, the unified model graph file, and the mesh controller graph file from the remote system;
- associates each of the mesh controller graph file, the unified model graph file, and the UI model graph file with the particular part via the unique identifier; and
- displays the particular part.

13. The system of claim 12, wherein the mobile application, in response to the selection of the particular part by the user via the mobile application, displays the particular part in a three-dimensional environment.

14. The system of claim 8, wherein the mobile application:
- receives a visual adjustment of at least one of the certain editable properties of the particular part;
- adjusts the at least one of the certain editable properties of the particular part to the updated maximum dimension; and
- updates the unified model graph file to reflect the adjustment to the at least one of the certain editable properties of the particular part.

\* \* \* \* \*